Sept. 13, 1949.   D. M. SCHWARTZ ET AL   2,481,952
WELDING ELECTRODE HOLDER
Filed June 8, 1945   4 Sheets-Sheet 3
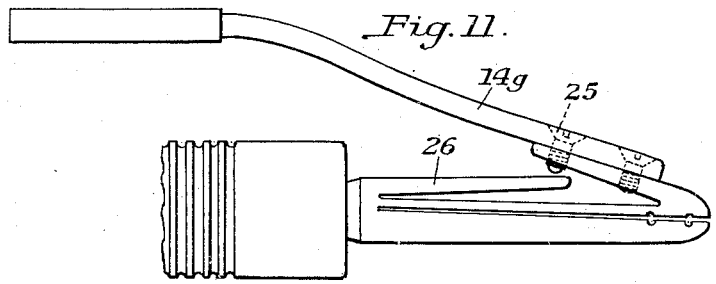
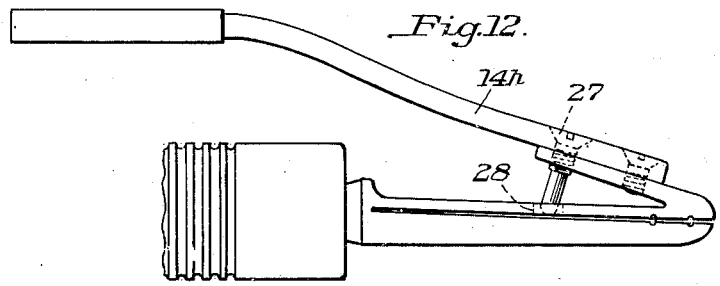
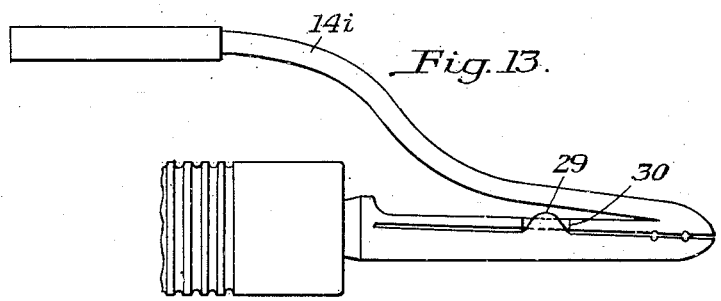
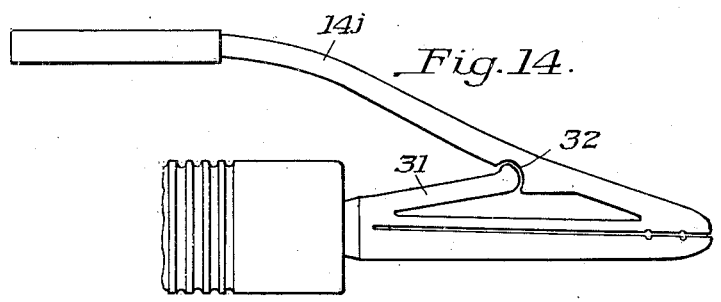
INVENTORS
Daniel M. Schwartz
William B. McLean
by Christy, Parmelee and Strickland
attorneys

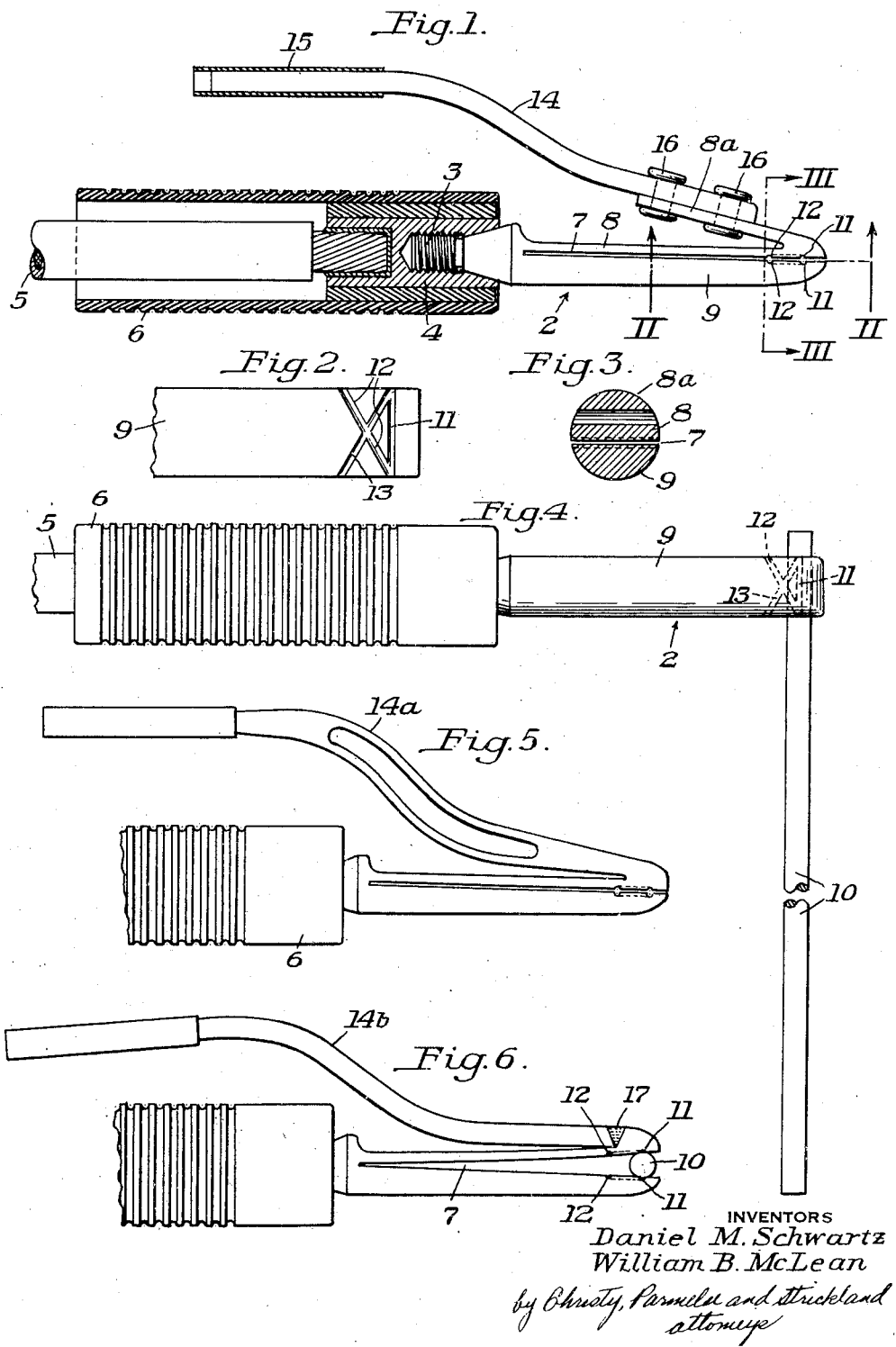

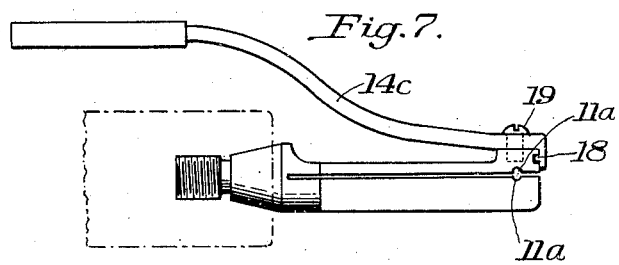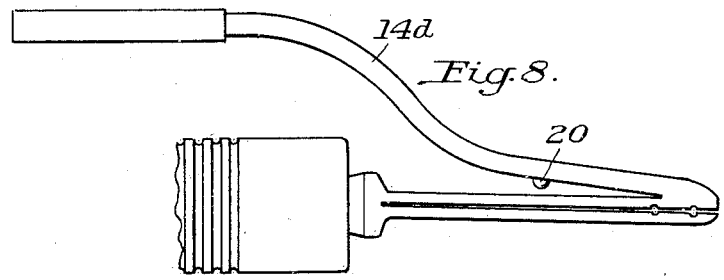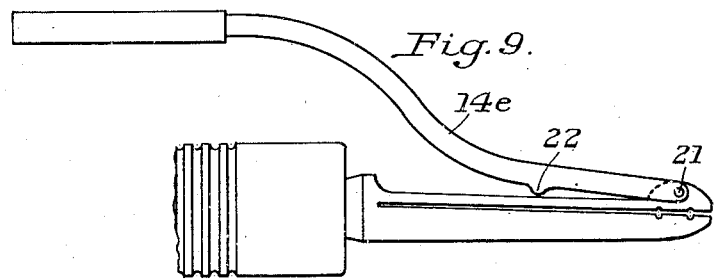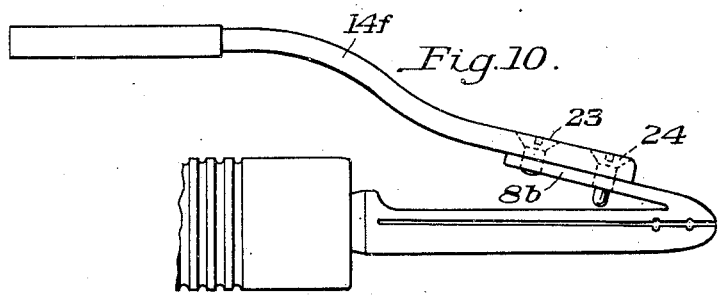

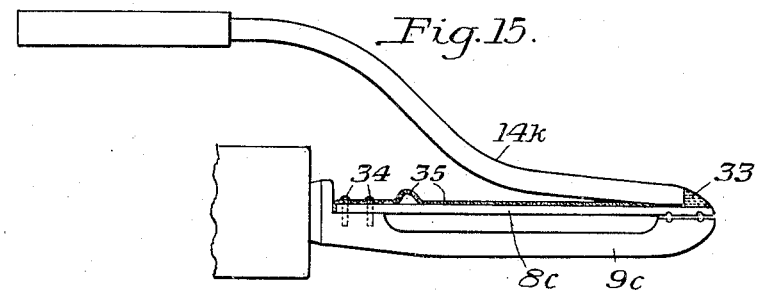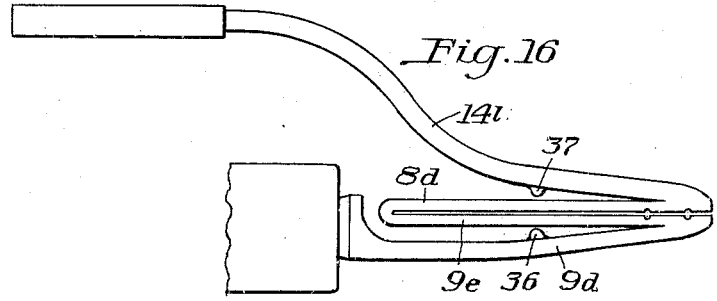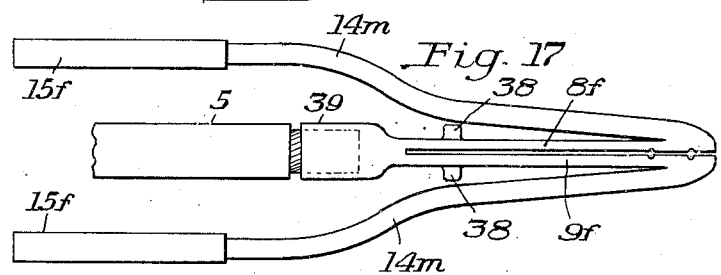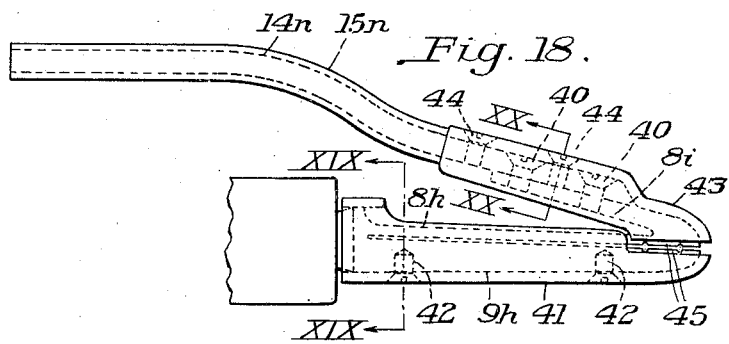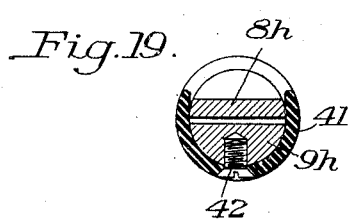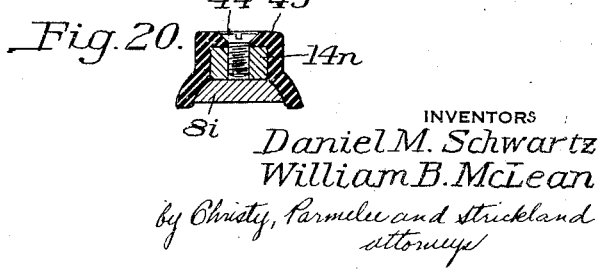

Patented Sept. 13, 1949

2,481,952

UNITED STATES PATENT OFFICE 2,481,952

WELDING ELECTRODE HOLDER

Daniel M. Schwartz, Pittsburgh, and William B. McLean, Coraopolis Heights, Pa.

Application June 8, 1945, Serial No. 598,290

27 Claims. (Cl. 219—8)

Our invention relates to, and consists in certain new and useful improvements in, welding electrode holders; that is, to those devices that are connected to the end of an electric conductor for the support of a welding rod or electrode during a welding operation. The metal body or bodies of the work to be welded is connected to form the ground terminal of the welding circuit, while the welding rod or electrode, connected through the body of the holder to the electric supply conductor, provides the "hot" terminal of the circuit, and welding is effected in the well-known way, with the body of the electrode being progressively melted away and fused to the metal body of the work to provide the desired weld.

The invention is particularly concerned with the type of electrode holders which comprise a pair of jaws between which the electrode is resiliently clamped under the effect of the inherent resilience of the bodies of the jaws.

Many different electrode holders are known to the art at the present time, but all of them are open to serious objections. For example, preexisting electrode holders are so heavy, bulky and relatively complicated in structure as to be unbalanced in the hand of the welder. Some types of holders are formed of a plurality of parts, including articulated joints which are conducive to poor conductivity of electric current; they are subject to wear, and are relatively bulky and heavy. Heretofore such holders have usually been formed partly of copper and partly of steel, the copper being used to provide maximum conductivity of welding current to the electrode. Ordinarily, springs are included in the holder structure to provide the desired force for clamping the jaws upon the electrode.

In other types of holders the jaws have been formed of spring steel, whereby the weight and size of the holder are minimized, and the resilience of the bodies of the jaws themselves is utilized to provide the electrode-clamping effect. But the advantages of such use of steel are definitely neutralized, due to the fact that the steel is a relatively poor conductor of electric current at welding intensities, wherefore the steel becomes overheated, necessitating that the holder be taken out of service at frequent intervals to cool. Also, the overheating of such holders results in the steel fatiguing in a relatively short time and losing the resilience necessary to exert the required clamping pressure upon the electrode.

In overcoming the objections to the prior structures, we provide an improved electrode holder of simplified and light construction, in which electric conductivity and inherent elasticity or resilience of the clamping jaws are obtained in most effective ratio. The electrode holder of the invention is essentially or principally formed of copper which affords the desired high electric conductivity, with minimized heating-up of the clamping jaws, and such copper is alloyed with beryllium in an amount which, when the alloy composition is subjected to a particular heat treatment, offsets the natural ductility of the copper and affords the desired relatively enduring tensile strength and resilience in the clamping jaws of the holder. While the electric conductivity of pure copper will not ordinarily be found in the alloy composition which we have discovered to be excellent for the purpose, the sacrifice which is made in conductivity does not result in the holder overheating to a prohibitive degree. The gains realized in the superior strength and inherent resilience of the holder jaws lead to advantages that more than compensate for the loss in conductivity As a matter of fact, the conductivity of the cuprous alloy of which we form our electrode holder is twice that of Phosphor-bronze and four times that of steel, with the effect that the loss in conductivity (as compared to pure copper) is practically insignificant, particularly in the light of the advantages gained.

In the accompanying drawings several forms of the welding electrode holder of our invention are illustrated:

Figure 1 is the view partly in elevation and partly in axial section of an electrode holder of the invention in service assembly with a conventional type of conductor cable;

Figure 2 is a fragmentary view, showing the face of one of the electrode-clamping jaws of the holder, as seen to larger scale, on the plane II—II of Figure 1;

Figure 3 is a view in cross section of the holder, showing certain details of construction to the same scale as Figure 2, on the plane III—III of Figure 1;

Figure 4 is a view in elevation of the holder, as seen looking upward from a plane of sight below Figure 1, and showing a welding rod or electrode clamped in the holder for a welding operation;

Figure 5 is a view in side elevation of an electrode holder of modified form. Whereas, in Figure 1 the jaw-operating handle of the holder is rigidly riveted to one of the jaws of the holder, in Figure 5, the handle is integrally formed with such jaw;

3

Figure 6 is a view comparable with Figure 5, but showing the operating handle rigidly welded or brazed to one of the jaws of the holder, and additionally indicating an electrode clamped in service position in the jaws;

Figure 7 is a view similar to Figures 5 and 6, illustrating still another mode of rigidly uniting the operating handle to a jaw of the holder;

Figures 8, 9, 10, 11, 12, 13 and 14 are views in side elevation of various fulcrum devices that may be included in the holder structure for augmenting the jaw-spreading effect of the handle when pressed;

Figure 15 is a view in side elevation of a holder in which a flexible conductor may be used with one of the jaws to increase electric conductivity;

Figure 16 is a view in side elevation of a holder in which the form of the jaws is elaborated with all current conducted to the supported electrode through a portion only of one of the jaws;

Figure 17 is a view in side elevation of a holder in which each jaw is provided with a handle, the two handles providing the necessary jaw-operating means while eliminating the need of the hand-grip otherwise normally provided upon the end of the conductor cable;

Figure 18 illustrates a holder in which the jaws are encased within molded plastic jackets of insulating material, as may be desirable in welding with alternating current; and Figures 19 and 20 are transverse sectional views of the upper and lower jaws of the structure of Figure 18, as respectively viewed on the planes XIX—XIX and XX—XX of Figure 18.

Referring to Figures 1 to 4 of the drawings, a presently preferred form of the holder will be understood to comprise a bipartite body 2 fashioned in this case of a round bar of stock that is threaded, or otherwise suitably formed, as at 3, to be secured in a contact socket or adapter 4 united as by solder to the end of a conductor cable 5 that supplies welding current, and in customary manner a hand-grip 6 of fibre or other suitable insulating material is secured upon the cable terminal and contact socket. The welder holds the instrument in his hand by means of the hand-grip 6. By virtue of this socket connection of the holder to the cable the welder (when moving from one location to another) may quickly unscrew the holder and connect it to a conductor cable at the new location, rather than leaving the holder connected and dragging the conductor cable after him. But in some cases, regardless of the advantage mentioned, it may be desirable to connect the holder more or less permanently to the cable.

The body of the holder is longitudinally slit, as shown at 7, to provide two jaws 8 and 9, between the distal ends of which an electrode or welding rod 10 (Figure 4) is clamped, and secured in electrical communication with the conductor cable. While the body of the holder is shown to be slit from the outer or distal end to the basal portion that is secured in the holder socket 4, it may in some cases be slit entirely through the basal portion, and integrity obtained by tightly securing the two portions in the socket.

At least one of the jaws is provided with a high degree of tensile strength, and with a high degree of resilience or elasticity in a direction extending transversely of its longitudinal axis, and it is under the effect of such inherent resilience of the jaw that the electrode is clamped in service position in the holder. The welding current flows from the conductor cable through the bodies of the jaws to the clamped electrode.

The meeting faces of the jaws 8 and 9 at the point where the electrode is engaged therebetween include complementary grooves which assist in aligning and securing the electrode in proper position. Specifically, the cooperating jaws include grooves 11 that extend normal to the longitudinal axes of the jaws, and the upper end of the electrode is positioned between these grooves when it is desired that the electrode shall be clamped in the position shown in Figure 4, in which the electrode is perpendicular to the body of the holder. The jaws also include inclined grooves 12 and 13, the grooves 12 serving when it is desired to position the clamped electrode in downwardly and outwardly inclined position with respect to the holder, while the grooves 13 are serviceable when it is desired to hold the electrode in downwardly and inwardly inclined position. As will presently appear, the jaws of the holder may be readily manipulated, to permit the electrode to be arranged in one of such positions or another, as is convenient to the welder in the progress of a welding operation.

As is shown in Figures 1 and 3 the lower jaw 9 is of relatively thick or heavy cross section to provide for stiffness and high electrical conductivity. The upper jaw 8 is of substantially less thickness or cross section than the jaw 9, and this is not without purpose, since it is desirable that at least one of the jaws may be readily flexed to spread or separate the jaws relatively to one another in order to permit the removal or introduction, or repositioning of an electrode. And means are organized with this jaw 8 of greater flexibility to permit of such manipulation.

Such means comprise a comparatively stiff operating handle or lever 14 of steel, which is rigidly united to the distal end of the jaw 8 and extended rearwardly therefrom into position alongside the hand-grip 6; where, covered with a sleeve or jacket 15 of insulating material, it is accessible to the grasp of the welder. By pressing or squeezing the handle 14 towards the body of the grip 6, the jaw 8 is flexed, and thereby the distal end of the jaw is moved away from the cooperating end of jaw 9. Thus, the jaws may be temporarily spread apart, to remove an engaged electrode, or to permit the introduction and positioning of an electrode between the jaws. When pressure is relieved on the handle 14, the jaw 8 under the effect of its inherent resilience, swings back towards its normal position, and in so doing clamps the interposed electrode securely against the relatively stiff jaw 9, the upper end of the electrode having first been aligned against the desired one of the grooves 11, 12 or 13 in the jaw 9.

The rigid union of the handle to the jaw 8 is effected by means of a portion 8a formed integrally with the distal end of the jaw. The portion 8a is formed by slitting the bar of which the holder is formed, and then bending such portion upward and to this portion 8a the handle 14 is secured by means of rivets 16. The effect is the same as though the end of the handle were rigidly secured immediately to the distal end of the jaw 8.

In a holder so constructed, it will be perceived that the body of the holder is of light and balanced weight, to be readily handled by the welder; it is compact, and of minimum cross-sectional dimensions; the nose of the holder is rounded and small, whereby the body of the holder does not obstruct clear vision of the work under the hand of the welder, and the electrode may be consumed until only a short stub remains; there are no articular or moving joints or connections in the holder, and no welded or soldered connections nor wires or jumpers in the path of current flow through the body of the holder to the electrode; the holder is of extremely simple unitary construction and is adapted to be easily insulated; and as presently will appear the body of the electrode does not overheat in service, whereby prolonged life is obtained.

While Phosphor-bronze, steel or copper-plated steel may be used in the construction of the holder, we obtain the optimum results mentioned earlier herein by forming the holder primarily or principally of copper, which copper is alloyed with beryllium to offset its ductility and to induce a relatively permanent high tensile strength and resilience. We have obtained good results with copper alloyed with from 2.00% to 2.25% of beryllium, and in some cases a slight quantity of cobalt or nickel, say from 0.25% to 0.35%, is added.

During or preceding the rolling of the bar stock of which the holder is formed, the copper-beryllium alloy is subjected to a high temperature annealing treatment, by holding the alloy at about 1450° F. for a period of from one to three hours. This causes the beryllium to go into solid solution in the copper. The alloy is then quenched in water to a supersaturated soft state, after which it is rolled or forged into bar stock. This cold working is beneficial in increasing the desired ultimate character of the alloy. After cold working, the stock is machined or otherwise suitably fashioned into the electrode holder. After machining, the shaped alloy body of the holder is heated to and held at from 550° F. to 625° F. for from two to three hours, after which time it is cooled in the air or quenched. This effects precipitation hardening of the alloy, giving an ultimate tensile strength of about 192,000 p. s. i., a yield point of about 173,000 p. s. i., and a low modulus of elasticity (about 18,000,000) which affords the relatively great deflection necessary when the jaws of the holder are spread. The electrical conductivity is about twice that of Phosphor-bronze and four times that of spring steel, and the alloy does not lose its strength through overheating in service. The treated alloy retains its resilience, and welding spatter will not stick to it.

It may be noted that the precipitation hardening treatment may be conducted for a greater time interval than from two to three hours, and in consequence an increase in electrical conductivity is obtained, with only a slight loss in strength. Indeed, certain alloy compositions within the analyses specified may be heated to and held at 600° F. for up to eight hours without resoftening.

When the holder is heated to precipitation hardening temperature all internal stresses in the alloy material are normalized, and the material has but little strength. In order to prevent distortion or sag, we support or brace the holder in a suitable jig provided for the purpose. The jaws of the holder are clamped together during heat-treatment, and are "set" in the position in which they are clamped by the hardening treatment. Consequently, when the holder is ready for service there is no initial stress in the jaws, and the jaws are free from "creep" effects.

During the use of the holder, the combination of heat and stress may eventually cause the jaws to creep open somewhat, losing some of their springiness. The holder can be easily reconditioned by clamping the jaws together and giving the material another precipitation hardening treatment, returning the holder to its original condition.

Whereas, in Figure 1 the operating handle 14 is shown to be a relatively stiff steel member that is riveted to the portion 8a of the more flexible jaw (8) of the holder, in Figure 5 we illustrate that the operating handle, 14a, may be integrally formed of the same material as the bipartite body of the holder itself. Figure 6 illustrates that the operating handle 14b may consist in a steel member welded or brazed, as at 17, to or adjacent to the distal end of the more flexible jaw. As may be visualized in Figure 6, the slot 7 is sloped downward from its inner end to the outer ends of the jaws, and the so-sloped slot is arranged nearly on the centerline of the holder. This insures better balance of the clamping effect, and facilitates the welding operation. Another advantage is that the center line of the electrode is aligned with the center line of the holder, while one jaw is of less flexibility than the other, which provides better electrode gripping effect. Still another advantage of the sloping slot is that the distal end of the upper jaw is thereby provided with sufficient body thickness to permit secure integration of the operating handle thereto, while still maintaining the body of the jaws within the original diameter of the bar stock. In the structure of Figure 1, as well as in certain other of the structures illustrated herein, the sloping of the slot provides adequate body material to form the rearwardly extending portion 8a to which the operating handle 14 is secured. Adequate material is provided at the distal end of the more flexible jaw 8 where greatest strength is required.

In further refinement the more flexible jaw 8 may be of varied thickness to provide at its proximal end, as well as at its distal end, greater strength at the points of maximum stress.

The holder of Figure 7 has its operating handle 14c united to the thickened outer end of the more flexible jaw of the holder, by means of a tongue-and-groove union 18 and a screw 19. This structure illustrates additionally that the sides of the jaws may be flattened if desired, and only one groove 11a formed in each jaw, although the first-described complement of grooves will ordinarily be included.

In Figure 8, we illustrate that both the upper and lower jaws may be made thin and flexible, with the effect that for a given spread of the jaws in securing an electrode lower stresses are imposed on the jaw bodies. This view further illustrates that a fulcrum device in the form of a knob 20 on the under face of the operating handle 14d may be provided to augment the flexing of the upper jaw when the handle is depressed, the knob 20 bearing on the upper face of the upper jaw and operating in a manifest way to increase the flexing or jaw-spreading action of the depressed handle.

Figure 9 illustrates a holder structure whose jaws are formed in general as the jaws of Figures 5 and 6 are formed, but contrary to the structures of the latter figures the operating handle 14e is pivotally connected, as at 21, to the upper or more flexible jaw. While the advantages of the rigid connection of the operating handle to the flexible jaw are not to be discounted; there may be cases where, due to the copper-beryllium composition we employ, a holder including an articulated connection can be used, in which case a fulcrum device, such as the knob or ridge 22 on the operating handle, will be provided.

Figure 10 shows that the steel operating handle 14f may be secured to the rearward extension 8b of the upper jaw by means of two flat-headed screws 23 and 24. The forward screw 24 is made to extend through and downward from the extension 8b to within close clearance of the top of the upper jaw. The screw 24 clears the upper jaw normally to prevent electrical contact therewith; but when the operating handle is depressed the tip of the screw contacts the jaw and acts as a fulcrum point to put bending moment and deflection into the jaw. While this construction will, for a given swing of the operating handle, open the jaws wider than the arrangements of Figures 1 to 6, a greater handle-depressing force is required for given jaw-spreading movement.

In Figure 11 the fulcrum device comprises the rear securing screw 25 of the handle 14g, and this screw is arranged to engage a forwardly extending leg 26 formed integrally of the same bar stock as the jaws of the holder. In this construction the full effect of the handle under pressure is utilized in flexing the upper jaw away from the lower jaw.

In Figure 12 the rear securing screw 27 of the handle 14h is extended to contact the lower jaw through a perforation 28 formed in the upper jaw. In this construction the movement of the handle required to effect a given spread of the jaws is less than in the structures of Figures 1, 5 and 6.

Further modifications in the form of the fulcrum device are illustrated in Figures 13 and 14. In Figure 13 an upstanding lug 29 is provided in the position shown on each side of the lower jaw, and the opposite edges of the upper jaw are notched as shown at 30 to receive the lugs 29, with the upper tips of the lugs standing above the top of the upper jaw. When the operating handle 14i is depressed, it bears upon the tips of the lugs 29 to increase the jaw-spreading effect of the handle. In Figure 14 an integrally formed extension 31 is rounded at its end to engage a socket 32 formed in the operating handle 14j, and an efficient fulcrum effect here to is obtained.

Figure 15 illustrates that one of the jaws, preferably as here shown the upper jaw 8c, may be independently fashioned of spring material and have the operating handle 14k secured, as by a weld 33, to its distal end. The jaw 8c may be secured at its inner end to the base of the holder, or to the inner end of the lower and main current-carrying jaw 9c, by means of screws 34 or other suitable device. The jaw 9c is of relatively rigid construction and high conductivity. If the spring material of which the upper jaw 8c is formed is a material (such as spring steel) of lower electric conductivity than the precipitation-hardened alloy we find so effective, a separate flexible jumper conductor such as braided copper wire 35 may be soldered in electric union to the basal end of the holder and the electrode-clamping end of the jaw. This jumper conductor, together with the highly conductive body of the lower jaw 9c, provides adequate current-conducting capacity between the electric supply cable and the welding electrode clamped between the ends of the jaws.

In the holder of Figure 16 both of the integrally formed clamping jaws are made flexible, and the lower jaw is formed in two parts 9d and 9e united only at the outer end of the holder. The upper jaw 8d is united at the inner end of lower jaw portion 9e and forms therewith a closed U between the outer ends of whose legs an electrode may be secured. An operating handle 14l is integrally formed with or united to the outer end of the upper jaw, and by pressing this handle the jaws 8d and 9d may be spread for introduction or removal of electrodes. The lower jaw portion 9d may be provided with an abutment 36 against which the lower jaw portion 9e may bear when stress is applied to spread the jaw portions 8d and 9e, this being particularly desirable where, as in this Figure 16, neither the upper jaw 8d nor the upper portion 9e of the lower jaw is connected at its basal end to the base of the electrode holder. Also a fulcrum device will advantageously be provided, such as a knob 37 on the lower face of the operating handle, to increase the jaw spreading effect of the handle. It is further noteworthy of the modification of Figure 16 that all current supplied to the engaged electrode is conducted through only one portion, 9d, of the lower jaw.

Figure 17 shows a holder in which each jaw 8f and 9f is provided with an operating handle or lever 14m of a type already described, and each jaw is provided with a knob 38 adapted to be engaged by the respective operating handle when the two handles are squeezed together, as they are squeezed, in order to spread the jaws for introduction and removal of electrodes. The knobs provide fulcrums which cooperate with the adjacent body portions of the operating handles to accentuate the jaw-spreading action of the squeezed handles. The insulated ends 15f of the two operating handles may be grasped in the hand without squeezing, to provide all of the grip that a welder needs to manipulate the holder and the engaged electrode in performing a welding operation, wherefore the hand-grip 6 of the structures first described may be dispensed with, this being particularly effective for those cases in which the electrode holder is desirably secured more or less permanently to the end of the conductor cable 5. The basal end of the holder is simply formed as a socket 39 in which the end of the conductor cable is soldered or otherwise electrically and mechanically secured.

Figures 18, 19 and 20 illustrate the manner in which the jaws of the holder as well as the operating handle may be substantially entirely insulated, so that the operator will be safe from electric shock, and the holder may be laid down (with the electrode removed) without causing a short circuit. For purposes of example, we show in these figures of drawings a holder structure similar to that shown in Figure 1, with the exception that the operating handle 14n is secured to the upper jaw extension 8i by means of screws 40 instead of rivets 16. The two jaws 8h and 9h of the holder are substantially encased within a jacket of molded insulating material, which in this instance is in the form of a tube 41 of complete circumferential continuity at a point at the basal end of the holder, but of interrupted circumferential continuity from such point outward to the ends of the jaws, providing an upwardly open trough in which the two jaws of the holder are sheathed, with clearance above the upper jaw 8h (see Figure 18) to permit such jaw to be flexed for introduction and removal of electrodes at the clamping ends of the jaws. The casing or jacket 41 of insulating material is held in place by means of screws 42 threaded into the body of the lower jaw 9h. The jacket is slipped into place over the basal end of the holder before the holder is screwed into the supporting socket at the conductor terminal, and by virtue of the complete cylindrical form of the jacket at its inner end only the outer screw 42 is required to secure it in place, and in many cases only one screw will be used. The outer end of the upper jaw, the rearward extension 8i of such jaw, and the end of the operating handle 14n secured to said extension, are sheathed on top and sides within a molded jacket 43 of insulating material which is held in place by screws 44 threaded into the metal body of the operating handle, and the body of such handle extending from the jacket 43 is sheathed by an insulating tubing 15n. It remains to be noted that the edges of the two jackets or sheaths 41 and 43 are so complementarily formed in the region 45 at the electrode-clamping ends of the jaws that the bodies of the jaws are effectively protected within insulation without interfering with the proper engagement of the jaws upon the body of an interposed electrode.

In all of the structures described the operating handle is connected or rigidly united to the flexible jaw or jaws of the holders, but it will be understood that in those cases in which the operating handle is pivotally connected in the holder structure the pivotal connection may be made to the heavier or more rigid jaw, in such manner that the angular movement of the handle operates through a fulcrum pin, or the like, to press the more flexible jaw away from the rigid jaw. Such arrangements are known in the art, and illustration and description of such structures need not be presented herein, since the foregoing specification clearly reveals the manner in which our improvements are applicable.

In the structures of Figures 1 to 7, 9 to 15 and 18 to 20, the electrode holder is formed with one of the two jaws of heavier or more rigid body than the other. It will be understood that it is possible to form this more rigid jaw of parted or forked construction, whereby the narrower, more flexible jaw may pass between the two parts of the more rigid jaw, thus giving the more flexible jaw, to which the handle is secured, a greater range of flexing, with an incidental increase in clamping pressure. Additionally, it may be noted that the more flexible jaw may be of laminated construction to give greater flexibility.

Within the terms of the appended claims it will be realized that many embodiments of the invention are covered, as well as various modifications, refinements and elaborations.

We claim:

1. An electrode holder including two jaws provided with means for establishing connection to an electric conductor and adapted to carry welding current to a welding electrode engaged by the jaws, said jaws being resilient in a direction transverse to their longitudinal axes for resiliently clamping the engaged electrode between them and characterized by being constituted principally of copper to provide for an effective conduction of welding current and alloyed with beryllium to offset the inherent ductility of the copper and induce the required inherent resilience, one of said resilient jaws being of less cross sectional area than the other and being flexible relatively thereto to facilitate spreading the jaws for introduction and removal of electrodes, and a jaw-flexing handle rigidly carried by the more flexible jaw.

2. An electrode holder including two jaws provided with means for establishing connection to an electric conductor and adapted to carry welding current to a welding electrode engaged by the jaws, said jaws being resilient in a direction transverse to their longitudinal axes for resiliently clamping the engaged electrode between them and characterized by being constituted principally of copper to provide for an effective conduction of welding current and alloyed with beryllium to offset the inherent ductility of the copper and induce the required inherent resilience, one of said resilient jaws being of less cross sectional area than the other and being flexible relatively thereto to facilitate spreading the jaws for introduction and removal of electrodes, and a jaw-flexing handle rigidly carried by the more flexible jaw, together with a fulcrum device for augmenting the jaw-flexing action of said handle when it is subject to jaw-flexing pressure.

3. An electrode holder provided with means for connecting it to an electric supply cable and including two jaws, at least one of which has a resilient body arranged to clamp a welding electrode to the other jaw under the effect of the inherent resilience of such jaw body, the resilient body of said jaw being formed of a copper-beryllium alloy of high tensile strength and high electrical conductivity, the body of said jaw formed of said alloy having the capacity to conduct electric current at welding intensity without overheating and losing its resilience over prolonged periods of service, and a handle carried by the distal end portion of said resilient jaw and extending rearwardly therefrom for use in flexing the jaw for release and introduction of an electrode.

4. A welding electrode holder comprising a section of resilient electrically conductive material slit longitudinally of the section on a line inclined to the axis thereof, said slit section providing two jaws, at least one of which is flexible for the introduction and removal of an electrode clamped between the jaws, and an operating handle attached to the latter jaw for flexing the same.

5. A welding electrode holder comprising a longitudinally slit bar of electrically conductive resilient material, the slit body providing two jaws arranged resiliently to clamp an electrode between them, and one jaw being of less cross section and more flexible than the other, and jaw-flexing means united to the body of the more flexible jaw.

6. A welding electrode holder comprising a longitudinally slit bar of electrically conductive resilient material, the slit body providing two jaws arranged resiliently to clamp an electrode between them, and jaw-flexing means rigidly united to and carried by each of said jaws and extending backwardly therefrom.

7. An electrode holder including two jaws, one of said jaws being resilient for clamping an electrode between it and the companion jaw and being more flexible than said companion jaw, a handle connected to the more flexible jaw adjacent to its distal end, and a non-articulated fulcrum device arranged to cooperate with the less flexible jaw and said handle for flexing the more flexible jaw relatively to the other.

8. An electrode holder including two jaws, at least one of which is formed of a resilient material for clamping a welding electrode to the other jaw in electrical communication with a supply of welding current, a handle connected to said resilient jaw adjacent to its distal end for use in flexing the jaw into electrode receiving and releasing position relatively to the other jaw, and a non-articulated fulcrum device cooperating with said handle to augment the jaw-flexing effect of the handle under applied pressure.

9. A welding electrode holder comprising a section of resilient electrically conductive material slit longitudinally of the section, said slit section providing two jaws, at least one of which is flexible for the introduction and removal of an electrode clamped between the jaws, and an operating handle rigidly attached to the latter jaw and extending backwardly therefrom for flexing the jaw.

10. A resilient jaw for an electrode holder formed for engaging an electrode, and a handle rigidly carried by the jaw and extending backwardly therefrom for use in flexing the jaw from electrode engaging into electrode releasing position.

11. An electrode holder jaw having an electrode clamping body and a handle portion rigid with and supported by such body, said handle portion extending longitudinally of and backwardly along the jaw body anad providing means for manually moving the jaw from electrode-clamping position.

12. An electrode holder including two jaws arranged to clamp an electrode, at least one of said jaws having a handle portion rigid with and supported by the body of such jaw, said handle extending longitudinally of the jaw and backwardly therealong to provide means for manually moving the jaw relative to the other jaw into electrode-releasing position.

13. An electrode holder including a set of two jaws joined at one end and at the opposite end arranged to clamp an electrode, at least one of said jaws having a handle portion rigidly united to and supported by the body of the jaw at a point spaced from the point at which said jaw is joined to the other jaw, said handle portion extending longitudinally of and backwardly from the set of jaws and providing means for manually spreading the handle-equipped jaw relatively to the other jaw.

14. A resilient jaw construction for a welding electrode holder, said jaw having a resilient body adapted for electrical connection to a supply of welding current, the resilient body of said jaw being formed of a metallic composition comprising essentially copper and beryllium up to substantially 2.25% and having a high tensile strength and high electrical conductivity for welding current, and being responsive to heat treatment for alloying the copper with beryllium and providing a jaw body having the capacity to conduct electric current at welding intensity without overheating in proximity to welding temperatures or losing its high tensile strength and resilience over prolonged periods of service.

15. An electrode holder having two jaws for securing a welding electrode, at least one of said jaws having a resilient body adapted for electrical connection to a supply of welding current, the resilient body of said jaw being transversely flexible relatively to the other jaw, said resilient jaw being formed of a metallic composition comprising essentially copper and beryllium up to substantially 2.25% and having a high tensile strength and high electrical conductivity for welding current, and being responsive to heat treatment for alloying the copper with the beryllium in precipitation hardened condition, the body of said jaw having the capacity to conduct electric current at welding intensity without overheating or losing its high tensile strength and resilience over prolonged periods of service in proximity to welding heat.

16. An electrode holder having two jaws for securing a welding electrode, each of said jaws having a resilient body adapted for electrical connection to a supply of welding current, the resilient body of each jaw being transversely flexible relatively to the other, each jaw being formed of a metallic composition comprising essentially copper and beryllium up to substantially 2.25% and having a high tensile strength and high electrical conductivity for welding current, and being responsive to heat treatment for alloying the copper with the beryllium and providing jaw bodies having the capacity to conduct electric current at welding intensity in proximity to welding temperatures without overheating or losing their high tensile strength and resilience over prolonged periods of service.

17. An electrode holder having two jaws for securing a welding electrode, at least one of said jaws having a resilient body adapted for electrical connection to a supply of welding current, the resilient body of said jaw being transversely flexible relatively to the other jaw, said jaw being formed of a metallic composition comprising essentially copper and beryllium up to substantially 2.25% and having a high electrical conductivity for welding current and an ultimate tensile strength and yield point each in excess of 100,000 pounds per square inch, and being responsive to heat treatment for alloying the copper with the beryllium and providing a jaw body having the capacity to conduct electric current at welding intensity without overheating in proximity to welding temperatures or losing its high tensile strength and resilience over prolonged periods of service.

18. An electrode holder comprising an elongate body adapted for electrical connection to a supply of welding current and being formed of a metallic copper-beryllium composition of high tensile strength and high electrical conductivity for welding current and being responsive to heat treatment for alloying the copper with the beryllium, said body being slit longitudinally on a line inclined to the axis thereof to provide two jaws, at least one of which is transversely flexible relatively to the other for the introduction of a welding electrode to clamped position between such jaws, the holder comprised of said body having the capacity to conduct electric current at welding intensity without overheating or losing its high tensile strength and resilience over prolonged periods of service in proximity to welding heat.

19. An electrode holder having two jaws, at least one of which is resilient for clamping a welding electrode between it and the other jaw, and a handle rigid with and supported by the body of said resilient jaw and extending rearwardly therefrom for use in flexing the jaw into electrode-receiving and releasing position relatively to the companion jaw.

20. An electrode holder having two jaws, at least one of which is resilient for clamping a welding electrode between it and the other jaw, and a handle rigid with and supported by the body of said resilient jaw and extending rearwardly therefrom for use in flexing the jaw into electrode-receiving and releasing position relatively to the companion jaw, and a contact fulcrum device cooperating with said handle to augment the jaw-flexing effect of the handle under applied pressure.

21. A welding electrode holder comprising a pair of jaws arranged to clamp an electrode between their distal ends, at least one of said jaws being flexible and resilient to provide clamping movement and clamping pressure, and the other jaw being of greater cross section at its basal end and more rigid than the first jaw, a handle rigid with and supported by the body of the more flexible jaw and extending rearwardly therefrom for use in flexing the jaw into electrode-receiving and releasing position relatively to the companion jaw.

22. A welding electrode holder comprising an elongate body of resilient electrically conductive material slit longitudinally to provide two jaws arranged resiliently to clamp an electrode, the line of the longitudinal slit in said body being located to provide one of said jaws with a smaller cross section and a greater flexibility than the other.

23. An electrode holder including two jaws, at least one of which is resilient for clamping a welding electrode to the other jaw, and a handle rigid with and supported by each of said jaws and extending rearwardly therefrom to provide means for manually grasping and supporting the holder in service, said handles being responsive to manually applied pressure for spreading the jaws into electrode receiving and releasing position.

24. An electrode holder including two jaws, at least one of which is resilient for clamping a welding electrode to the other jaw, and a handle rigidly united to and supported by the distal end portion of each of said jaws and extending rearwardly therefrom to provide means for manually grasping and supporting the holder in service, said handles being responsive to manually applied pressure for spreading the jaws into electrode receiving and releasing position.

25. An electrode holder having two jaws for securing a welding electrode, at least one of said jaws having a resilient body adapted for electrical connection to a supply of welding current, the resilient body of said jaw being transversely flexible relatively to the other jaw for resiliently clamping an electrode between said jaws and characterized by being composed principally of copper to provide for an effective conduction of welding current and alloyed with beryllium to offset the inherent ductility of the copper and induce the required inherent resilience, said copper-beryllium jaw having a high tensile strength and being responsive to heat treatment to provide a jaw body having the capacity to conduct electric current at welding intensity in proximity to welding temperatures without overheating or losing its high tensile strength and resilience over prolonged periods of service, and a handle rigidly carried by said flexible jaw and extending backwardly therealong for use in flexing the jaw to release or introduce an electrode between the two jaws.

26. An electrode holder having two jaws for securing a welding electrode, at least one of said jaws having a resilient body adapted for electrical connection to a supply of welding current, the resilient body of said jaw being transversely flexible relatively to the other jaw for resiliently clamping an electrode between said jaws and characterized by being composed principally of copper to provide for an effective conduction of welding current and alloyed with beryllium to offset the inherent ductility of the copper and induce the required inherent resilience, said copper-beryllium jaw having a high tensile strength and being responsive to heat treatment to provide a jaw body having the capacity to conduct electric current at welding intensity in proximity to welding temperatures without overheating or losing its high tensile strength and resilience over prolonged periods of service, and a handle formed of different material from said jaw and being secured to and supported by the body of said jaw and extending backwardly along the jaw body from a forward portion thereof for use in flexing the jaw to release or introduce an electrode between the two jaws.

27. A resilient jaw construction for a welding electrode holder, said jaw having an elastic body adapted for electrical connection to a supply of welding current, the resilient body of said jaw being formed of a metallic composition comprising essentially copper and beryllium in sufficient quantity to be responsive to heat treatment for alloying the copper with the beryllium and to produce a high tensile strength and high electrical conductivity for welding current, and providing a jaw body having the capacity to conduct electric current at welding intensity without overheating in proximity to welding temperatures or losing its high tensile strength and resilience over prolonged periods of service.

DANIEL M. SCHWARTZ.
WILLIAM B. McLEAN.

REFERENCES CITED

The following references are of record in the file of this patent:

UNITED STATES PATENTS

| Number | Name | Date |
| --- | --- | --- |
| 1,247,800 | Earnest | Nov. 27, 1917 |
| 1,313,572 | Baker et al. | Aug. 19, 1919 |
| 1,353,028 | Clements | Sept. 14, 1920 |
| 1,551,729 | Burns | Sept. 1, 1925 |
| 1,732,441 | Griffiths | Oct. 22, 1929 |
| 1,761,728 | Hechman | June 3, 1930 |
| 2,143,619 | Bourgue | Jan. 10, 1939 |
| 2,261,373 | Hoenie et al. | Nov. 4, 1941 |
| 2,371,649 | Radabough | Mar. 20, 1945 |
| 2,423,058 | Van Dyke | June 24, 1947 |

OTHER REFERENCES

"The Metal Industry" (London), May 20, 1938, page 534.

Certificate of Correction

September 13, 1949

Patent No. 2,481,952

DANIEL M. SCHWARTZ ET AL.

It is hereby certified that errors appear in the printed specification of the above numbered patent requiring correction as follows:

Column 7, line 52, for the words "here to" read *here too*; column 14, line 29, for "an elastic" read *a resilient*;

and that the said Letters Patent should be read with these corrections therein that the same may conform to the record of the case in the Patent Office.

Signed and sealed this 7th day of February, A. D. 1950.

[SEAL]

THOMAS F. MURPHY,
*Assistant Commissioner of Patents.*